(12) United States Patent
Bobrow et al.

(10) Patent No.: US 8,266,169 B2
(45) Date of Patent: Sep. 11, 2012

(54) COMPLEX QUERIES FOR CORPUS INDEXING AND SEARCH

(75) Inventors: Daniel G Bobrow, Palo Alto, CA (US); Robert D Cheslow, Los Angeles, CA (US)

(73) Assignee: Palo Alto Reseach Center Incorporated, Palo Alto, CA (US)

( * ) Notice: Subject to any disclaimer, the term of this patent is extended or adjusted under 35 U.S.C. 154(b) by 687 days.

(21) Appl. No.: 12/338,029

(22) Filed: Dec. 18, 2008

(65) Prior Publication Data

US 2010/0161639 A1 Jun. 24, 2010

(51) Int. Cl.
*G06F 17/30* (2006.01)
(52) U.S. Cl. ...................................................... 707/759
(58) Field of Classification Search .................. None
See application file for complete search history.

(56) References Cited

U.S. PATENT DOCUMENTS

| | | | |
|---|---|---|---|
| 5,488,719 A | 1/1996 | Kaplan et al. | |
| 6,023,760 A | 2/2000 | Karttunen | |
| 6,167,369 A | 12/2000 | Schulze | |
| 6,272,456 B1 | 8/2001 | de Campos | |
| 7,072,827 B1* | 7/2006 | Carmel et al. | 704/9 |
| 7,346,511 B2 | 3/2008 | Privault et al. | |
| 7,359,851 B2 | 4/2008 | Tong et al. | |
| 7,383,268 B2* | 6/2008 | Krokosz | 707/741 |
| 2003/0140035 A1* | 7/2003 | Burrows | 707/3 |
| 2004/0122656 A1* | 6/2004 | Abir | 704/4 |
| 2004/0128122 A1 | 7/2004 | Privault et al. | |
| 2004/0267722 A1* | 12/2004 | Larimore et al. | 707/3 |
| 2006/0098899 A1* | 5/2006 | King et al. | 382/305 |
| 2007/0033165 A1* | 2/2007 | Sheinwald et al. | 707/3 |
| 2007/0250501 A1* | 10/2007 | Grubb et al. | 707/5 |

OTHER PUBLICATIONS

D. Bauer, F. Segond, and A. Zaenen, "LOCOLEX: the translation rolls off your tongue", Proceedings of ACH-ALLC, Santa-Barbara, USA, 1995.
K. Beesley and L. Karttunen, "Finite State Morphology", CSLI publications, Palo Alto, CA, 2003, Chapters 2.4.2 (pp. 66-74), 3.5.5 (pp. 169-182), and 7 (pp. 339-373).
W. Cavnar and J. Trenkle, "N-Gram-Based Text Categorization", Proceedings of SDAIR-94, 3rd Annual Symposium on Document Analysis and Information Retrieval, 1994.
D. Cutting, J. Kupiec, J. Pedersen, and P. Sibun, "A practical part-of-speech tagger", Proceedings of the Third Conference on Applied Natural Language Processing 1992.
Inxight Product Datasheet, "Inxight SmartDiscovery™ fact extraction", available Apr. 8, 2008 on the Internet at http://www.inxight.com/pdfs/FactExtraction_Web.pdf.

(Continued)

*Primary Examiner* — Bai D. Vu
(74) *Attorney, Agent, or Firm* — Fay Sharpe LLP

(57) ABSTRACT

Computer methods, apparatus and articles of manufacture therefor, are disclosed for developing a complex-query pattern that is transformed into a region-matching transducer. A corpus-level transducer and the region matching transducer are combined. The combined transducer is applied to a corpus to identify strings therein that satisfy patterns defined in the corpus-level transducer, including the complex-query pattern, with each identified pattern being recorded in a corpus index. The corpus and the corpus index are made available for receiving a query with the query tag for querying the corpus and applying the query using the corpus index to identify locations in the corpus that satisfy the query.

19 Claims, 16 Drawing Sheets

OTHER PUBLICATIONS

R. Kaplan, J. Maxwell, T. King, and R. Crouch, "Integrating Finite-state Technology with Deep LFG Grammars", available Apr. 8, 2008 on the Internet at http://www.parc.com/research/publications/files/5215.pdf.

R. Kaplan, and T. King, "Low-level mark-up and large-scale LFG grammar processing", in Proceedings of the LFG03 Conference. CSLI On-line Publications, 2003.

L. Karttunen, "Applications of Finite-State Transducers in Natural-Language Processing", in Revised Papers From the 5th international Conference on Implementation and Application of Automata, S. Yu and A. Paun, Eds., Lecture Notes in Computer Science, vol. 2088. Springer-Verlag, London, pp. 34-46, 2000.

L. Karttunen, "Constructing lexical transducers", International Conference on Computational Linguistics. Association for Computational Linguistics, Morristown, NJ, pp. 406-411, 1994.

L. Karttunen, "Directed replacement", Proceedings of the 34th Annual Meeting on Association for Computational Linguistics, pp. 108-115, 1996.

L. Karttunen, J. Chanod, G. Grefenstette, and A. Schille, "Regular expressions for language engineering", Natural Language Engineering vol. 2, Issue 4, pp. 305-328, 1996.

L. Karttunen, "The Replace Operator", in Proceedings of the 33rd Annual Meeting of the Association for Computational Linguistics, ACL-94, Boston, Massachusetts, pp. 16-23, 1995.

Palo Alto Research Center Media Backgrounder, "PARC Natural Language Processing", available on the Internet at http://www.parc.com/research/projects/natural_language/docs/PARC_Natural-Language_backgrounder.pdf, dated Mar. 2007.

Ramakrishnan and Gehrke, "Database Management Systems", Third Edition, McGraw-Hill, 2003, pp. 16 and 275-282.

A. Shiller, "Multilingual Finite-State Noun Phrase Extraction", Proceedings of the ECAI 96 Workshop, 1996.

"Description of Related Art" in U.S. Appl. No. 12/338,029, paragraph Nos. 0004-0027, pp. 2-9.

* cited by examiner

EXAMPLE REGION-MATCHING REGULAR EXPRESSION:
define Det the | a | ... ;
define WS " " | - | ... ;
define Adj quick | brown | lazy | ... ;
define Noun fox | dog | ... ;
define Slogan (@I.Det@ @I.WS@) [@I.Adj@ @I.WS@]* @I.Noun@ [@I.Noun@]* </NP>:0;

FIG. 8

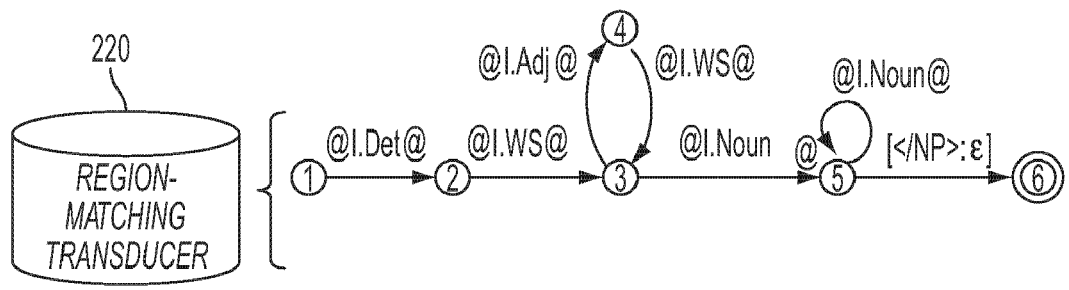

FIG. 9

EXAMPLE LANGUAGE DATA:
    The quick brown fox jumped over the lazy dogs.

EXAMPLE OUTPUT AFTER APPLYING PATTERNS REGION MATCHING TRANSDUCER USING A FINITE-STATE MATCHING OPERATOR:
    <NP>The quick brown fox</NP> jumped over <NP>the lazy dogs</NP>.

FIG. 10

EXAMPLE REGULAR EXPRESSION:

define Initial {any capitalized English word};
define WS " " | - | ... ;
define Middle {any English word with optional weak punctuation};
define Final {any English word with final punctuation};
define English (@I.Initial@ @I.WS@) [@I.Middle@ @I.WS@]* @I.Final@ </ENGLISH>:0;

EXAMPLE OF COMPLEX-QUERY PATTERN:
define @car_fiinancing SYNS(car) NEXT SYNS(loan)

SYNS of "car": "automobile", "vehicle", etc.
SYNS of "loan": "finance", "mortagage", etc

EXAMPLE REGULAR EXPRESSION:
define CAR car | automobile | vehicle | ... ;
define LOAN loan | financing | mortgage | ...;
define WS " " | - | ... ;
define @car_loan @l.CAR@ @l.WS@ @l.LOAN@ </car_loan>:0;

EXAMPLE CORPUS DATA WITH POSITIONAL INFORMATION IDENTIFYING THE START OF EACH SENTENCE:
[1]John bought an automobile from a dealer with financing. [58]The dealer...

EXAMPLE EXTRACTED POSTINGS CORPUS INDEX :
John : 1
buy : 1
automobile : 1
dealer : 1
financing : 1
/car_loan : 1
dealer : 58

FIG. 26

EXAMPLE SORTED/CONSOLIDATED POSTINGS CORPUS INDEX :
automobile : 1, ...
buy : 1, ...
/car_loan : 1, ...
dealer : 1, 58, ...
financing : 1, ...
John: 1, ...

FIG. 27

EXAMPLE QUERY USING A QUERY TAG:

@car_loan AND "John"

EXAMPLE SEARCH RESULTS AFTER INTERSECTING THE SENTENCE POSITIONS WHERE BOTH QUERY TERMS "car_loan" AND "John" APPEAR IN THE CORPUS:

John bought an automobile from a dealer with financing {@car_loan}.

COMPLEX QUERIES FOR CORPUS INDEXING AND SEARCH

CROSS REFERENCE TO RELATED APPLICATION

Cross-reference is made to the following U.S. patent applications Ser. No. 12/338,058, entitled "Region-Matching Transducers For Natural Language Processing" and Ser. No. 12/338,085, entitled "Region-Matching Transducers For Text-Characterization" that (a) are concurrently filed herewith, (b) are assigned to the same assignee as the present invention, and (c) are incorporated in this patent application by reference.

BACKGROUND

The following relates generally to methods, apparatus and articles of manufacture therefor, for defining finite-state networks for marking, tagging, characterizing, or indexing input data recognized by the networks as intelligible natural language data. Such marked data may subsequently be further processed using natural language applications, such as categorization, language identification, and search. In one embodiment, the finite-state marking networks are applied to corrupted language data to mark intelligible language data therein. Text-based errors may be introduced in language data, for example, when image-based documents or audio-based files are processed to identify characters or words therein using, for example, OCR (optical character recognition) or voice-to-text applications. Text-based errors may arise from character recognition errors that introduce misspellings that render a word or sentence that it forms part of unintelligible. Such errors hamper subsequent language processing search or analysis of the textual data using natural language processing applications.

Once a corpus is processed using finite-state natural language technology the data may be indexed for the purpose of querying information in the corpus. An index is generally a data structure that may be used to optimize the querying of information, by for example, indexing the location of key terms found in a corpus. Queries may be simple or complex. For example, a simple query may be used to search for the presence of two terms in a corpus, while a complex query used for example in a Database Management System (DBMS) may be defined using a specialized language called a query language. Generally, facilities for creating indices and queries are usually developed separately, and have different properties.

DESCRIPTION OF RELATED ART

Palo Alto Research Center (PARC) has developed and commercialized natural language technology that has been used in various natural language applications, as described in "PARC Natural Language Processing", Media Backgrounder, March 2007. One such technology enables finite-state machines to form linguistic descriptions that may be used in applications that include spell checking, identifying and classifying named entities, OCR language modeling, and information extraction. Basic language processing, such as tokenization, morphological analysis, disambiguation, named-entity recognition, and shallow parsing, may be performed with such PARC finite-state natural language technology.

Further, such PARC finite-state natural language technology includes authoring and compiler tools for creating finite-state networks, such as automata and transducers, as well as, runtime tools for applying such networks to textual data. Finite-state networks may be compiled from different sources, including word lists and regular expressions, a formal language for representing sets and relations. A relation is a set of ordered string pairs, where a string is a concatenation of zero or more symbols. Further, calculus operations may be performed on networks, including concatenation, union, intersection, and composition operations, and the resulting networks may be determinized, minimized, and optimized.

For example, such PARC finite-state technology may be used to apply finite-state networks to strings. For example, a network that is a lexical transducer for English may be used to analyze inflected and lexical forms of words (e.g., the inflected form "leaves" may produce the lexical forms "leave+Verb+Pres+3sg", "leave+Noun,+Pl", and "leaf+Noun+Pl" and the lexical form "leave+Noun+Pl" may produce the inflected form "leaves").

A. Finite-State Replacement Expressions

Finite-state replacement expressions include, for example, simple replacement operations (e.g., A - >B) and marking operations (e.g., UPPER @PREFIX . . . SUFFIX). Generally, definitions of finite-state replacement expressions and example uses are described in Chapters 2.4.2 and 3.5.5 of the publication by K. Beesley and L. Karttunen, entitled "Finite State Morphology", CSLI publications, Palo Alto, Calif., 2003, which entire contents, including but not limited to Chapters 2.4.2 and 3.5.5, are incorporated herein by reference.

For example, technology for performing entity recognition is known, such as Inxight SmartDiscovery™ fact extraction software made available by Inxight Software, Inc. (see Inxight SmartDiscovery™ fact extraction Product Datasheet), which recognizes named entity types based on patterns in text. In addition, XLE (Xerox Linguistic Environment) software made available by PARC is adapted to perform shallow markup to identify named entities (see in addition R. Kaplan, and T. King, "Low-level mark-up and large-scale LFG grammar processing", in Proceedings of the LFG03 Conference, CSLI On-line Publications, 2003).

A.1 Compile-Stage Replacement Methods

U.S. Pat. No. 6,023,760, which is incorporated herein by reference in its entirety, discloses in section D.3 methods for defining matching finite-state transducers for marking instances of a regular language using the simple replace operation (represented by the symbol "- >"), which is non-deterministic, or using the directed replacement operations (such as the left-to-right, longest-match replace operator represented by the symbol "@- >"), which are deterministic. For example, named entities may be marked in a regular language to appear as XML mark-up (e.g., <company>PARC</company>). Such named-entity XML markup may be introduced into textual content by applying thereto a pattern matching finite-state transducer (FST) that has been compiled into a network from a regular expression.

Additional background concerning the use of the replace operators is disclosed in the following publications: L. Karttunen entitled "The Replace Operator", in Proceedings of the 33rd Annual Meeting of the Association for Computational Linguistics, ACL-94, Boston, Mass., pp. 16-23, 1995; L. Karttunen entitled "Directed Replacement", in Proceedings of the 34th Annual Meeting on Association For Computational Linguistics, pp. 108-115, 1996; and L. Karttunen, J. Chanod, G. Grefenstette, and A. Schille, "Regular Expressions for Language Engineering", Natural Language Engineering Vol. 2, Issue 4, pp. 305-328, 1996.

Directed replacement operations (such as the left-to-right, longest-match directed replacement operator represented by the symbol "@->") function well in cases where the pattern being matched consists of a small number of elements. For example, patterns representing social security numbers may be represented with a lexicon that identifies eleven characters: three digits, a dash, two digits, a dash, and four digits, and patterns representing dates may be represented with a lexicon that identifies a month component, a day component, and a year component. However, the use of directed replacement operators with a lexicon to represent patterns that identify names, such as example definitions in Table 1, becomes computationally expensive with respect to the compilation time of the network and size of the network as the number of patterns defined by the lexicon increases.

In the example definitions in Table 1, "Name" is defined as consisting of either a first name or a last name preceded by an optional first name, where "space" is an optional whitespace character. The general form of the replacement expression in Table 1 is of the form "UPPER @->PREFIX ... SUFFIX", which when compiled produces a transducer that locates instances of UPPER in the input string under the left-to-right, longest-match regimen, but instead of replacing the matched strings, the transducer copies them, inserting the specified prefix and suffix. Accordingly, the "NameParser" transducer in Table 1 maps Lauri (FirstName) Karttunen (LastName) to <Name> Lauri Karttunen </Name>, following the left-to-right, longest-match principles of the directed replacement operator represented by the symbol "@->" and the special symbol "...", which is used to mark the place around which insertions are to be made.

TABLE 1 define Name FirstName | (FirstName space) LastName;
define NameParser Name @-> "<Name>" ... "</Name>";

A.2 Apply-Stage Replacement Method

In an alternate method, referred to herein as "the apply-stage replacement method" or "the pmatch method", is adapted to scale with a large number of names. In the apply-stage replacement method, replacement operations are implemented when a finite-state network is applied to a string (i.e., during the apply stage, e.g., when a network is applied to an inflected form to produce a lexical form). This alternate method is more efficient to perform a longest-match replacement during the apply stage rather than hard-coding such constraints into a transducer for use with replacement operations using directed replacement operators, such as the left-to-right, longest-match replace operator (represented by the symbol "@->") discussed above. In addition, the apply-stage replacement method marks a pattern only upon reaching the end of a matched pattern, and allows the same string to match more than one pattern. These efficiencies lead to a smaller network size that permits a matching network to scale with a large number of names or entities.

Table 2 set forth an example definition using the apply-stage replacement method. Similar to the example shown in Table 1, the example shown in Table 2 produces a transducer that maps Lauri Karttunen to <Name> Lauri Karttunen </Name>. However, unlike the left-to-right, longest-match principles of the directed replacement operator, the apply-stage replacement method operates according to the following principles: (a) a pattern starts from the beginning of a string or after a non-alphanumeric symbol (i.e., if no match is found after examination of a first symbol of a word, subsequent symbols are written without examination, together with the first symbol, to an output buffer); (b) the longest match is always attempted to be made and no search is ever started in the middle of another search (e.g., the preliminary result "Lauri" is ignored for the longer match "Lauri Karttunen"); and (c) upon reaching the final state, with one or more tag arcs following a match because of an epsilon (i.e., a symbol representing an empty string) on the input side and with the next input symbol satisfying a default ending condition, an initial tag is inserted into the output buffer followed by a copy of the matching string and a closing tag.

TABLE 2 define Name FirstName | (FirstName space) LastName;
define NameParser Name </Name>:0;

Table 3 sets forth an example illustrating additional features of the apply-stage replacement method. In the example in Table 3, the resulting Names network that consists of a linear path for the string "Sara Lee", leading to the penultimate state with two arcs, one labeled "</Company>" and the other "</Person>", is adapted to recognize all instances of Sara Lee (e.g., whether as a person or a company). Advantageously, the Names network combines several patterns into a single network that may be used to match in parallel.

TABLE 3 define CTag "</Company>":0;
define PTag "</Person>":0;
define Persons {Sara Lee};
define Companies {Sara Lee};
define Names Companies CTag | Persons PTag;

More specifically, when the Names network defined in Table 3 is applied to the input string "He works for Sara Lee.", the apply-stage replacement method starts at the beginning of the input string and at the start state of the Names network by trying to match the first symbol "H" of the input against the arcs of the current pattern state. If it finds a match, it advances to the arc's destination state and to the next symbol in the input string. If it fails to find a match, as the case is here, it writes the "H" into an output buffer and advances to the next symbol, "e". Before starting the matching process, the left context at its current position is checked. The default requirement is that a pattern should start from the beginning of a string or after a non-alphanumeric symbol. Because the "e" and the following space do not meet the starting condition, they are appended to the output buffer without any attempt to match them. With this input string, the matching attempts fail until the process reaches the letter "S". From there on, the input matches the path leading to the penultimate state of the Names network. At that point, the end of the input string has been reached but both of the tag arcs yield matches because they have an epsilon on the input side. Having reached a final state over a tag arc with no input left to check, the default ending condition is determined to be satisfied since the next symbol of the input string is a period.

Upon satisfying the default ending condition, the apply-stage replacement method reads off the tag on the output side of the label, creates the corresponding initial XML tag and inserts it into the output buffer. Depending on the order of the tag arcs in the penultimate state, the start tag is either <Company> or <Person>. Assuming <Company> is the start tag, the method continues by inserting the start tag into the output buffer and copies the matching string into the output buffer followed by the closing tag. At this point the output buffer contains the string "He works for <Company> Sara Lee</

Company>". In processing the second tag (i.e., <Person>), the method takes note of the fact that it has already performed one analysis for the string and wraps the second pair of initial and closing tags around the first pair. The final output of the method is "He works for <Person><Company>Sara Lee</Company></Person>.".

Assuming, by way of a further example of the apply-stage replacement method, "Sara" and "Lee" are added to the "Persons" list in Table 3. Given the same input string as the preceding example, a successful match occurs at the point where the output buffer contains the string "He works for <Person>Sara</Person>". Even though the method detects that a final state of the Pattern network has an outgoing arc due to a space symbol, the method ignores this preliminary result and attempts to make a longer match because the method always looks for the longest match. At the point when the method comes to the <Company> and <Person> tags, the preliminary output gets overwritten and the final output is similar to the preceding example. Because the method never starts a search in the middle of another search, it will not try to find a match for "Lee" in this case. Consequently, this method passes over strings that are substrings of a successfully matched longer string.

Depending on the desired output format, the apply-stage replacement method operates according to one or more of the output modes set forth in Table 4. The output modes may be controlled, for example, using interface variables, with each variable having a default value.

TABLE 4

Mark-patterns: Wrap XML tags around the strings that match a pattern, for example, <Actor>Grace Kelly</Actor>.
Locate-patterns: Leave the original text unmodified. Produce an output file that indicates for each match its beginning byte position in the file, length of text, text, and XML tag, for example, 78|11|Grace Kelly|<Actor>.
Extract-patterns: Extract from the file all the strings that match some pattern. Output them with their tags. For example, <Actor>Grace Kelly</Actor>. Ignore all the rest.
Redact-patterns: Ignore strings that match some pattern. Output the rest.

B. Syntactic Analysis

Replacement expressions have been used to perform syntactic analysis. For example, as disclosed in Chapter 3.5.5 of the publication by K. Beesley and L. Karttunen, entitled "Finite State Morphology", CSLI publications, Palo Alto, Calif., 2003, under the section entitled "Bracketing or Markup Rules", longest-match operators may be used for bracketing noun phrases in text, after a sentence has already been morphologically analyzed and reduced to part-of-speech tags. One way to characterize English noun phrases is to start with an optional determiner (Det), followed by any number of adjectives Adj*, and end with one or more nouns Noun+, which may be represented using the following regular expression: (Det) Adj*Noun+.

In addition, the publication by A. Shiller, entitled "Multilingual Finite-State Noun Phrase Extraction", in Proceedings of the ECAI 96 Workshop, 1996, describes using finite-state technology for marking and labeling noun phrases. As set forth in Section 5 of the publication, a noun phrase markup transducer may be applied to tagged text (i.e., after tokenization and part-of-speech disambiguation is performed on the text) to insert brackets around and label the longest matching noun phrase patterns in the text.

C. Beyond Keyword Searching

For certain classes of document collections, keyword searching is not sufficient on its own to provide access to relevant documents in such collections. Keyword searching may not function well, for example, when a document collection: consists of many different genres of documents (e.g., email versus a memo), suffers from different kinds of errors (e.g., poor OCR quality versus poor categorization), and supports different types of users (e.g., an engineering organization versus a marketing organization). Solutions for improved keyword searching include term-based indices and query languages. Term-based indices provide rapid access to document content in a collection. Query languages enable greater search precision beyond keyword searching with operations between keywords (e.g., AND and OR operations) and with operators that act on searches (e.g., NEAR, which enables the notion of proximity or NEXT, which enables the notion of keyword order).

SUMMARY OF BACKGROUND

Accordingly, there continues to be a need for systems and methods for pre-processing text-based document collections that originate from image-based or audio-based data in-advance of further linguistic-based document processing. Further, there continues to be a need for systems and methods for improved pattern matching finite-state technology for use with categorization methods (e.g., topic, language identification, etc.).

In addition, there continues to be a need for systems that improve searching heterogeneous document collections with automated term-based indexing. More specifically, there continues to be a need for improved systems and methods that integrate the development of database indices together with complex query generation to simplify query formation and search.

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 8 illustrates an example region-matching regular expression;

FIG. 9 illustrates an example region-matching transducer;

FIG. 10 illustrates example language data and example output after applying the "Slogan" region-matching transducer shown in FIG. 8;

FIG. 26 illustrates example extracted postings;

FIG. 27 illustrates the example postings shown in FIG. 26 after being sorted and consolidated;

DETAILED DESCRIPTION

A. Conventions And Definitions

Figure 1:
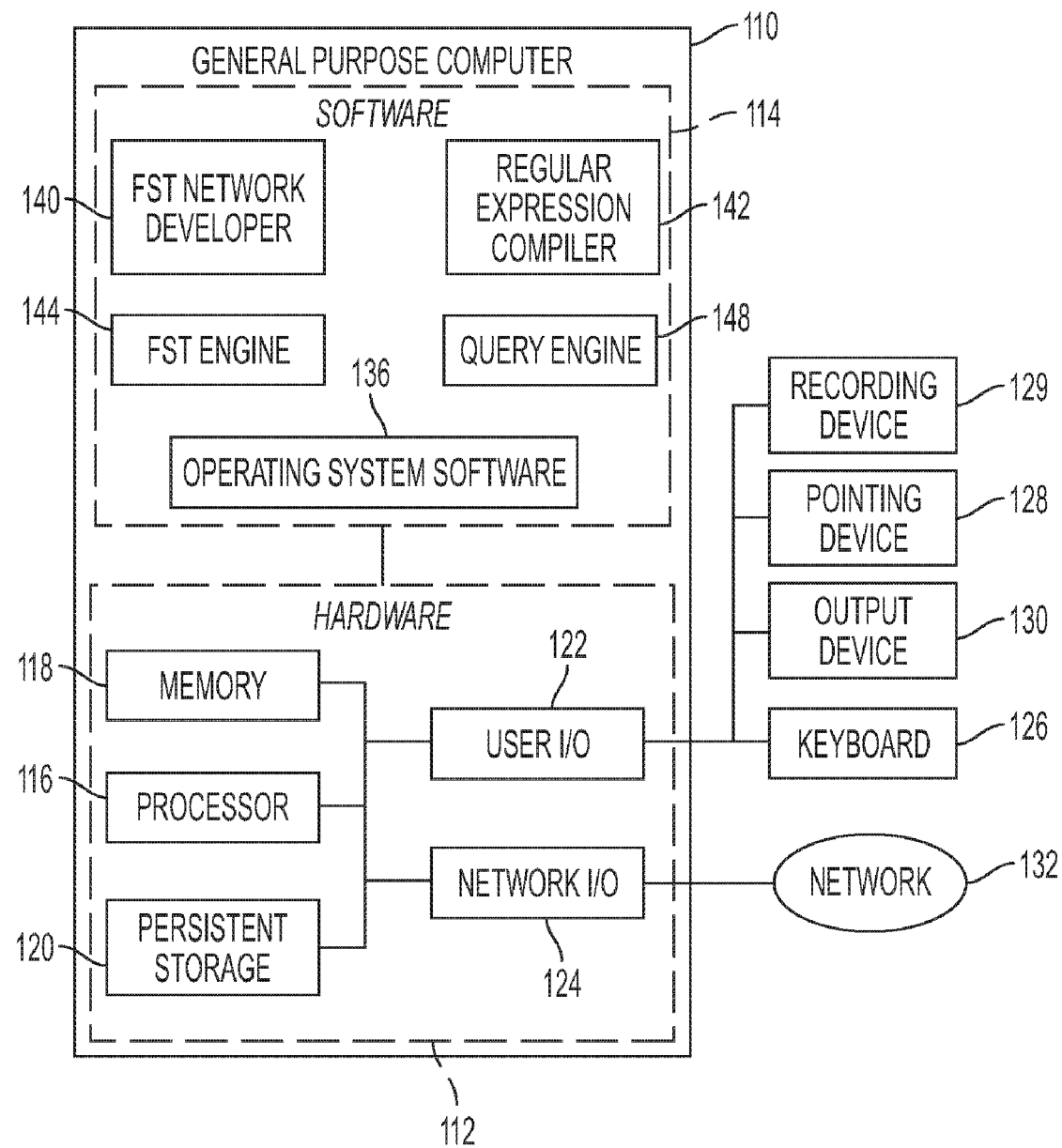
FIG. 1 illustrates a general purpose computer for carrying out embodiments.

Finite-state automata are considered to be networks, or directed graphs that are represented in the figures using directed graphs that consist of states and labeled arcs. The finite-state networks may contain one or more initial states, also called start states, and one or more final states. In the figures, states are represented as circles and arcs are represented as arrows. Also in the figures, the start states are represented as the leftmost states and final states are marked by a double circle.

Each state in a finite-state network acts as the origin for zero or more arcs leading to some destination state. A sequence of arcs leading from the initial state to a final state is called a "path". A "subpath" is a sequence of arcs that does not necessarily begin at the initial state or end at a final state. An arc may be labeled either by a single symbol such as "a" or a symbol pair such as "a:b" (i.e., two-sided symbol), where "a" designates the symbol on the upper side of the arc and "b" the symbol on the lower side. If all the arcs are labeled by a single symbol, the network is a single-tape automaton; if at least one label is a symbol pair, the network is a transducer or a two-tape automaton; and more generally, if the arcs are labeled by "n" symbols, the network is an n-tape automaton.

Arcs of finite-state networks may include "Flag Diacritics", which are special symbols of the form @X.Y.Z@ or @X.Y@ where "X" represents some action that the FST Engine 144 should take when it encounters the symbol when applying a network with a Flag Diacritic to a string, "Y" represents a feature, and "Z" a value. One type of action "X" is the action "insert flags" represented by "I". For example, applying the Flag Diacritic @I.Det@ in an original network, involves processing the input in the "Det" network and resume the process in the original network once a final state in the Det network has been reached.

A Flag Diacritic can be compiled out of a network by splicing in the network to which the Flag Diacritic refers. For example, an insert flag such as @I.Det@ may be removed from a network by splicing in the Det network for each arc in the network with @I.Det@ label. A network with Flag Diacritics or with its Flag Diacritics compiled out produces equivalent output. However, the relative size of the network with Flag Diacritics will be smaller depending on the number of times a Flag Diacritic repeats and the size of the network that is spliced in for the Flag Diacritic. Additional information concerning Flag diacritics is described in Chapter 7 of the publication by K. Beesley and L. Karttunen, entitled "Finite State Morphology", CSLI publications, Palo Alto, Calif., 2003.

Further background on finite-state technology is set forth in the following references, which are incorporated herein by reference: Lauri Karttunen, "Finite-State Technology", Chapter 18, The Oxford Handbook of Computational Linguistics, Edited By Ruslan Mitkov, Oxford University Press, 2003; Kenneth R. Beesley and Lauri Karttunen, "Finite State Morphology", CSLI Publications, Palo Alto, Calif., 2003; Lauri Karttunen, "The Replace Operator", Proceedings of the 33rd Annual Meeting of the Association for Computational Linguistics, Boston, Mass., pp. 16-23, 1995; U.S. Pat. No. 6,023,760, entitled "Modifying An Input String Partitioned In Accordance With Directionality And Length Constraints".

The table that follows sets forth definitions of terminology used throughout the specification, including the claims and the figures. Other terms are explained at their first occurrence.

| Term | Definition |
| --- | --- |
| String, Language, and Relation | A string is concatenation of symbols that may, for example, define a word or a phrase, or a portion thereof. The symbols may encode, for example, alphanumeric characters (e.g., alphabetic letters), music notes, chemical formulations, biological formulations, and kanji characters (e.g., which symbols in one embodiment may be encoded using the Unicode character set). A language refers to a set of strings. A relation refers to a set of ordered pairs, such as {<a,bb>, <cd,e>}. |
| Entity | A collection of alphanumeric symbols that have an understood or assigned meaning, such as a word or phrase. Examples of entities include but are not limited to people, companies, and dates. |
| Document | A collection of electronic data that may include one or a combination of text, images, and graphics. Entities may form all or part of the content of a document using one or more of a combination of text, images, and graphics. Such document content may be rendered on hardcopy representations (e.g., paper) or softcopy representations (e.g., electronic display) that may be viewed or touched (e.g., as Braille on a hardcopy representation). Alternatively, such document content may be rendered into an audio representation for listening. In addition, such representations may be electronically recorded (e.g., |

-continued

| Term | Definition |
|---|---|
| | using a recording device such as a camera, a scanner, and microphone) for further processing and subsequently re-rendered. |
| XML | EXtensible Markup Language |
| <xxx> </xxx> | an XML tag that defines the start and end of an item labeled "xxx", respectively |
| Union Operator "\|" | Constructs a regular language that includes all the strings of the component languages. For example, "a\|b" denotes the language that contains the strings "a" and "b", but not "ab". |
| "Define" Function | The variable "v" may be defined as the language of the possible values. For example, "define color [blue\|green\|red\|white\|yellow]", defines the language "color" with the possible values blue, green, red, white, and yellow. |
| A -> B | Replacement of the language A by the language B. This denotes a relation that consists of pairs of strings that are identical except that every instance of A in the upper-side string corresponds to an instance of B in the lower-side string. For example, [a -> b] pairs "b" with "b" (no change) and "aba" with "bbb" (replacing both "a"s by "b"s). |
| A @-> B | Left-to-right, longest match replacement of the language A by the language B. Similar to [A -> B] except that the instances of A in the upper-side string are replaced selectively, starting from the left, choosing the longest candidate string at each point. |
| ε (i.e., epsilon) | Denotes the symbol for an empty string. |
| @I.Y@ | Denotes a Flag Diacritic that may appear on an arc of a first network, where "I" identifies the insert Flag Diacritic and "Y" refers to a second network without having to repeat it. |

B. Operating Environment

FIG. 1 illustrates a general purpose computer 110 for carrying out embodiments. The general purpose computer 110 includes hardware 112 and software 114. The hardware 112 includes but is not limited to a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 may include a keyboard 126, a pointing device 128 (e.g., pointing stick, mouse, etc.), a recording device 129, and an output device (e.g., display, printer, etc.) 130. The network I/O 124 may for example be coupled to a network 132 such as the Internet.

The software 114 of the general purpose computer 110 includes an operating system 136, FST network developer 140, a regular expression compiler 142, an FST engine 144, and a query engine 148. The operating system 136 enables a user of the general purpose computer 110 to compose finite-state networks using the FST network developer 140 and develop queries using query engine 136, as more fully described below.

C. Pattern Matching Networks Development

Figure 2:
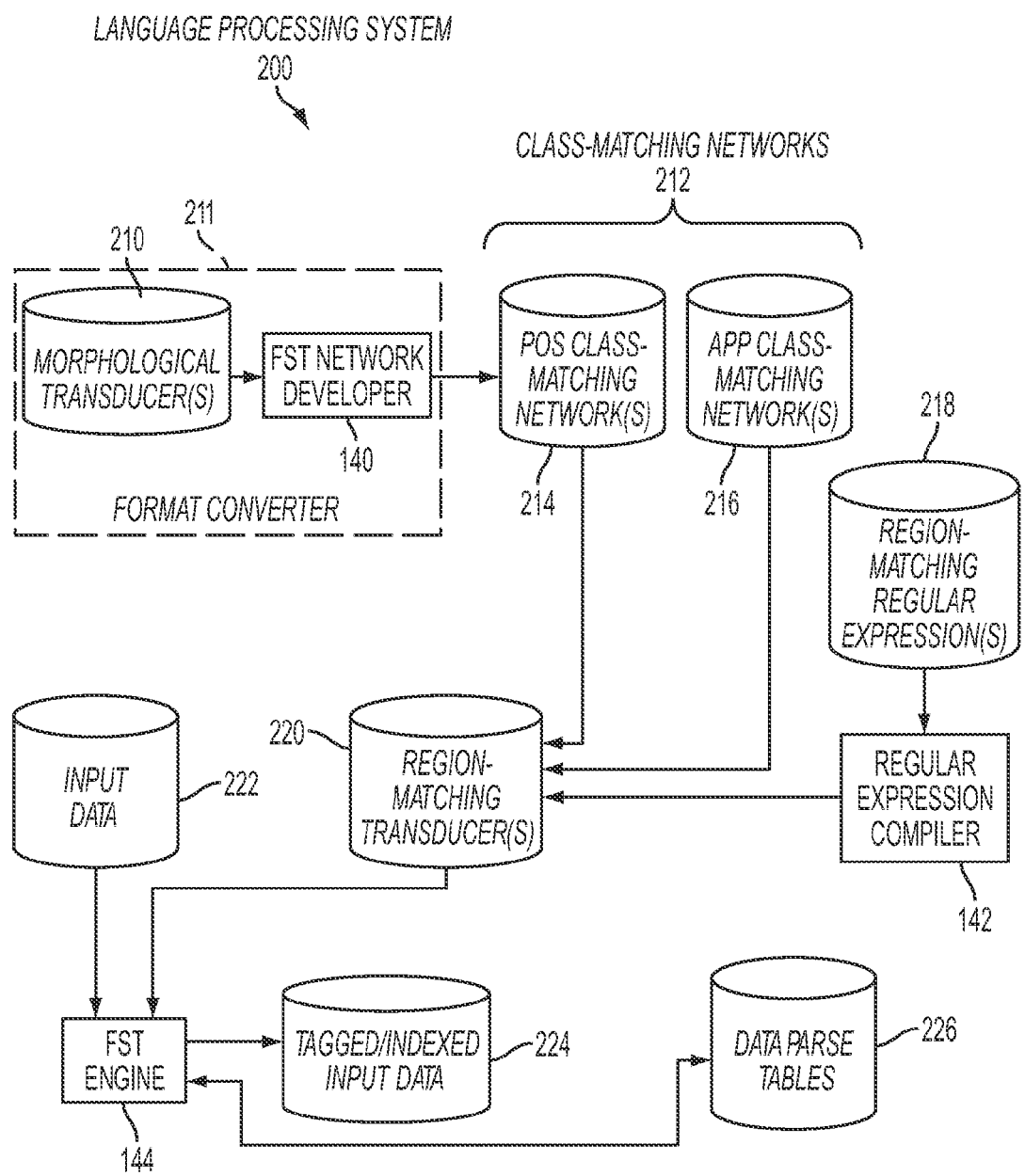
FIG. 2 illustrates a language processing system that may operate on the general purpose computer shown in FIG. 1.

FIG. 2 illustrates a language processing system 200 that may operate on the general purpose computer shown in FIG. 1. The language processing system 200 includes the regular expression compiler 142 for developing region matching transducers 220 from region-matching regular expressions 218 that may subsequently be applied to input data, such as natural language data, using the FST engine 144 to produce tagged and/or indexed input data 224 and to populate data parse tables 226. In addition, the FST engine 144 may include or be coupled to different language processing applications, such as categorization, language identification, and search, for using the tagged and/or indexed input data 224 and the populated data parse tables 226, as further described herein.

Figure 3:
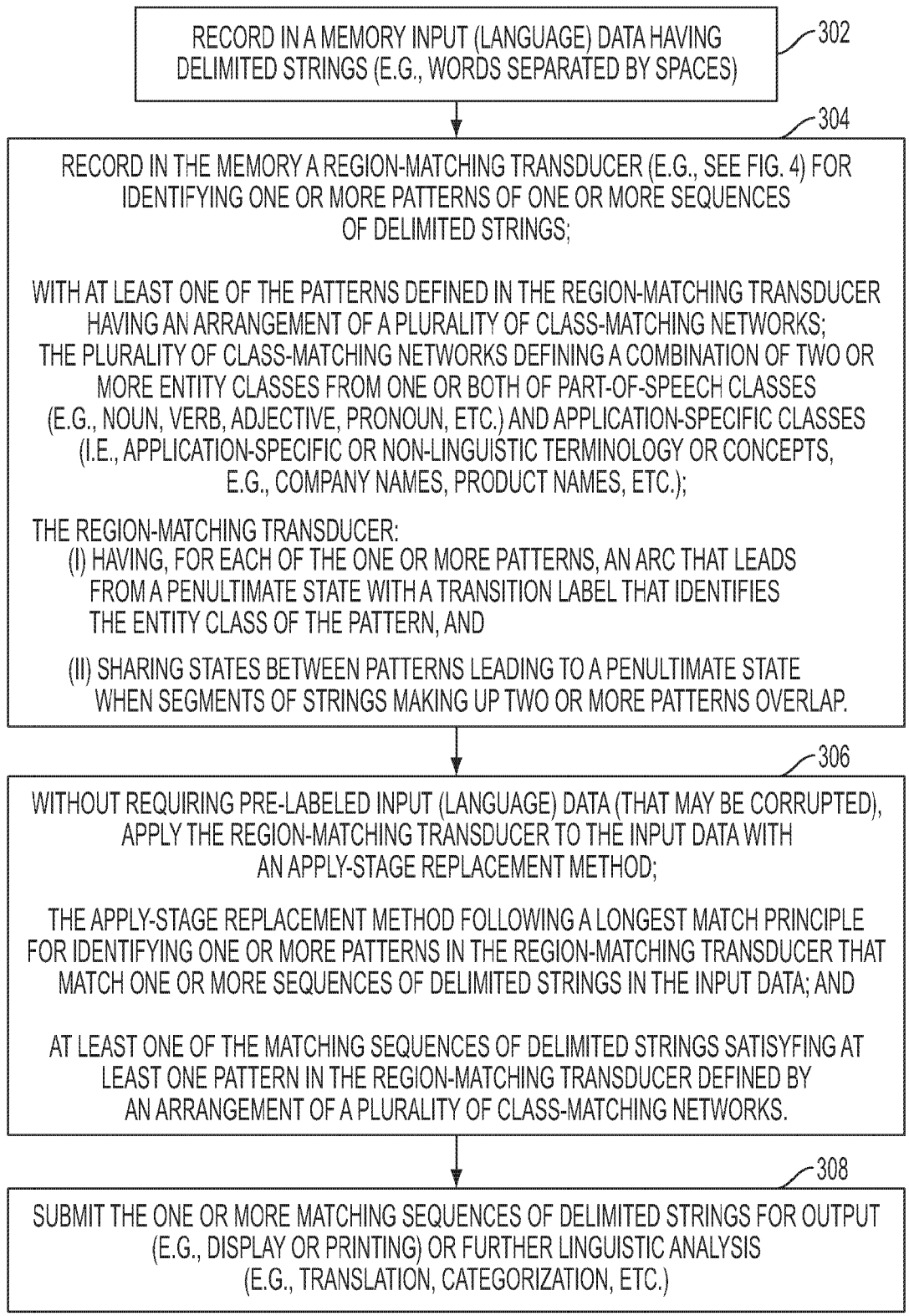
FIGS. 3 and 4 are flow diagrams for developing a region matching transducer for marking identified patterns in language data.
Figure 4:
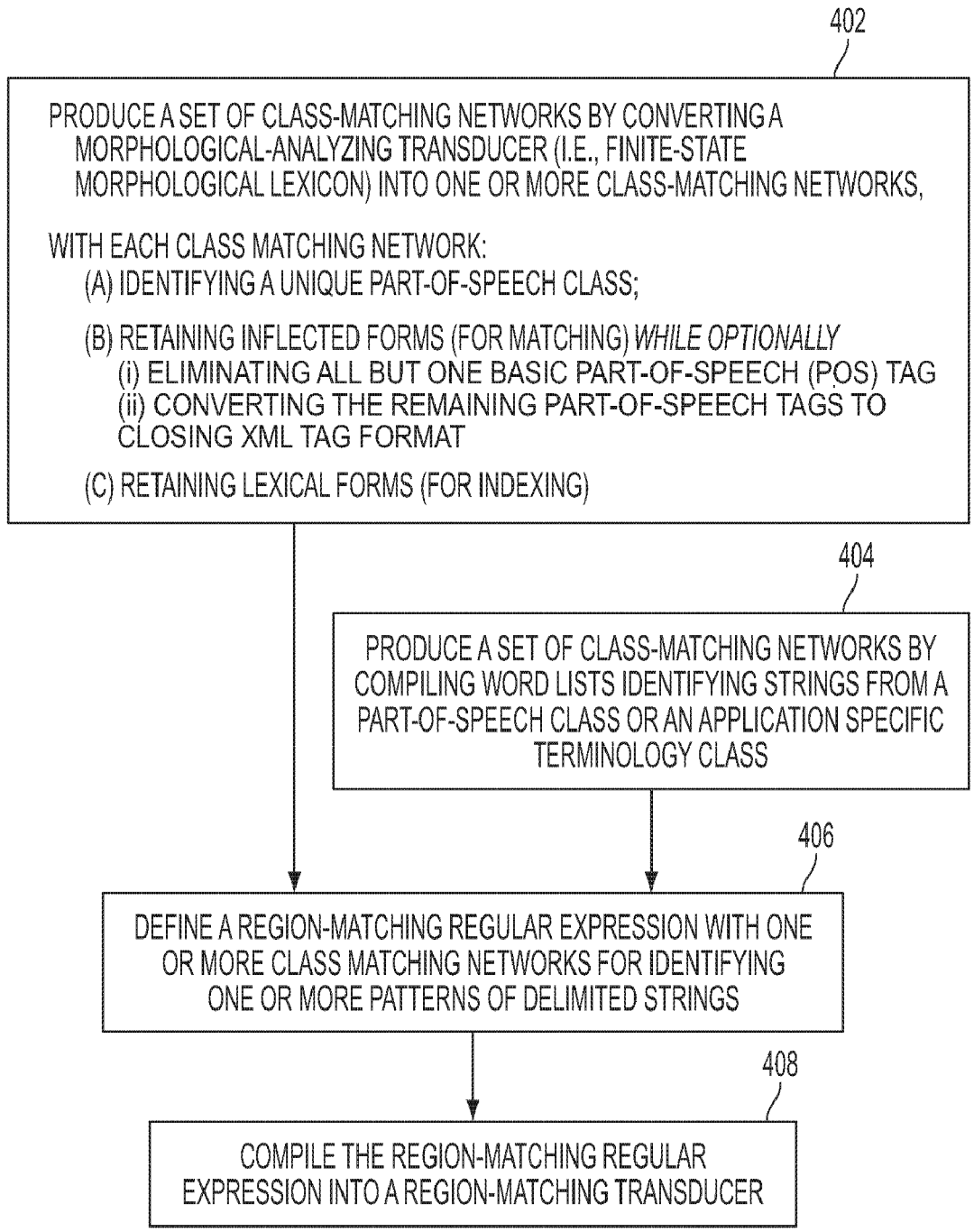

FIGS. 3 and 4 are flow diagrams for developing a region matching transducer for marking identified patterns in input data, such as language data. At 302, language data having delimited strings is recorded in a memory (such as memory 118). For example, delimited strings forming part of language data 222 (or more generally input data) may include words separated by spaces, as illustrated by the example language data set forth in FIG. 10.

At 304, one or more region matching transducers 220 are recorded in a memory, such as the memory 118, that define one or more patterns of one or more sequences of delimited strings. At least one of the patterns in the region matching transducers 220 defines an arrangement of a plurality of class-matching networks 212. For example, a plurality of class-matching networks 212, defining a region matching transducer 220, may be arranged to match a pattern of words that define a noun phrase produced with the union of two class-matching networks 212. More generally, a region-matching transducer 220 may be produced using one or a combination of class-matching networks 212 from one or both of POS-class (e.g., noun, verb, adjective, pronoun, etc.) matching networks 214 and AAP (i.e., application-specific or non-linguistic terminology or concepts, e.g., company names, product names, etc.) class-matching networks 216.

Figure 6:
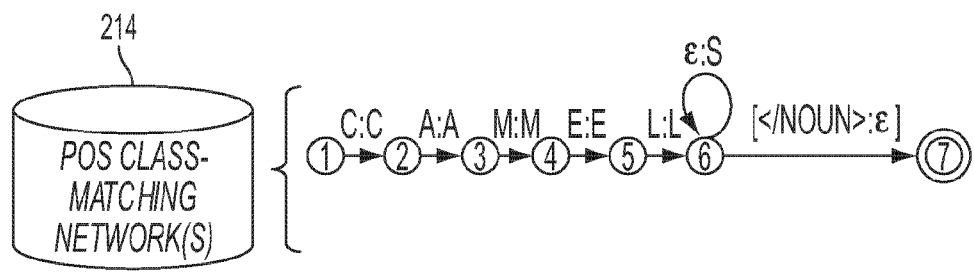
FIG. 6 illustrates an example POS class-matching network.

The region-matching transducers 220 recorded in the memory 118 have for each of the one or more patterns defined in the class-matching networks 220, an arc that leads from a penultimate state with a transition label that identifies the entity class of the pattern, as shown for example in the network in FIG. 6 with the transition label "</NOUN>". In addition, the region-matching transducer 220 recorded in the memory 119 shares states between patterns leading to a penultimate state when segments of strings making up two or more patterns overlap, as shown for example in the network in FIG. 6 which shares the base word "camel" for the words "camel" and "camels". One embodiment for producing a region-matching transducer 220 is set forth in the flow diagram shown in FIG. 4.

At 402 in FIG. 4, POS (Parts-Of-Speech) class-matching networks 214, a first type of class-matching network 212, are produced. The POS class-matching networks (or network) 214 are networks that identify parts-of-speech such as nouns, verbs, adjectives, pronouns, etc. In one embodiment, the POS class-matching networks 214, may be produced using format converter 211 which includes FST network developer 140 and a morphological transducer 210. The format converter 211 converts a morphological lexicon, which may be represented as a morphological transducer, into a format expected by the FST engine, which implements the apply-stage replacement method. In one embodiment, the morphological transducer may be converted using command scripts that delete, move, and/or introduce tags as desired. A morphological transducer that implements a language, such as English, may include a plurality of morphological tags, such as, "+Sg" (i.e., singular), "+Pl" (i.e., plural), "+Pres" (i.e., present), "+PastPart" (i.e., past participle), etc. for morphologically analyzing natural language. Morphological analysis is the process which takes the surface form of a word and returns its lemma (i.e., the normalized form of a word that may be found in a dictionary), together with a list of morphological features and parts of speech. A morphological transducer is bi-directional and can be used to generate either surface forms (e.g., cat or cats) from their lexical form (e.g., cats is the plural form of the lemma cat), or a surface form from a lexical description (e.g., the plural form of cat is cats). For example, in the morphological transducer shown in 5, surface forms appear on the lower side of the arcs and morphological tags together with the canonical form appear on the upper side of the arcs. Following the two different paths one ends up with either the singular (represented by tag +Sg) form (with no s at the end—represented using the epsilon symbol) or the plural (represented by tag +Pl) form of the noun (represented by tag +Noun) camel (with an s at the end).

Figure 5:
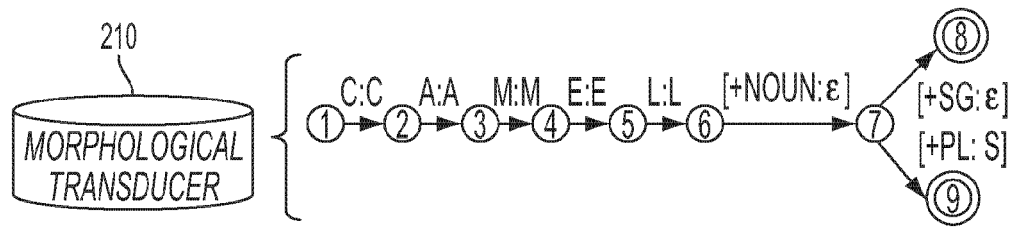
FIG. 5 illustrates an example morphological transducer.

Given a morphological transducer 210, such as the morphological transducer shown in FIG. 5, the FST network developer 140 eliminates all but basic POS (or morphological) tags, as detailed morphological analysis is less important for semantic indexing than parsing. When eliminated POS tags are paired with other than an epsilon (e.g., the plural POS tag being paired with the character "s"), the eliminated POS tag is substituted for an epsilon symbol so that those inflected forms (e.g., "camels") produce the appropriate lemma (e.g., "camel"). The POS tags that are not eliminated are converted to a closing XML tag format. For example in converting the morphological transducer shown in FIG. 5 to the POS class-matching network 214 shown in FIG. 6, the FST network developer 140 eliminates the POS tags for singular (i.e., +Sg) and plural (i.e., +Pl) and converts the basic POS tag for noun (i.e., +Noun) into the closing XML tag format (e.g., </NOUN>). In addition, the basic POS tag converted to the closing XML tag format is arranged to appear at the end of the POS class-matching network 214, as shown in the example network in FIG. 6.

Figure 7:
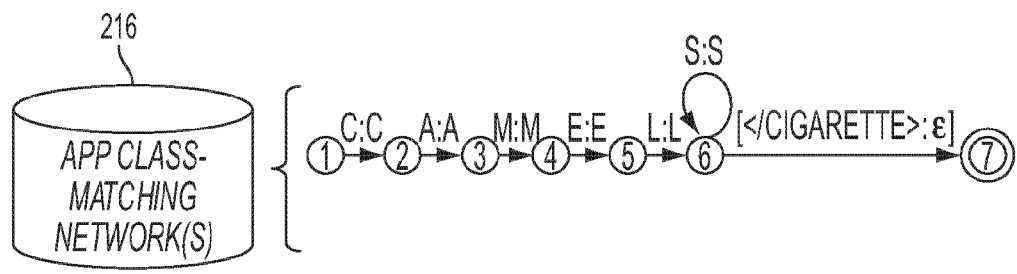
FIG. 7 illustrates an example APP class-matching network.

At 404 in FIG. 4, APP (APPlication specific) class-matching networks 216, a second type of class-matching networks 212, are produced. The APP class-matching networks 216 may be used separately or to augment the POS class-matching networks 214 with application-specific patterns that in different embodiments may be used to identify non-linguistic terminology and non-linguistic concepts, which may in turn be augmented to develop more complex patterns with different levels of granularity that may be required or be optional elements of the patterns. By way of example, the POS class-matching networks 214 shown in FIG. 6, may be used to identify non-linguistic concepts, such as, companies, products, places, and people as shown by the APP class-matching network 216 in FIG. 7, which identifies "camel" or "camels" with the label "cigarette". More generally, the APP class-matching network 216, such as the network shown in FIG. 7, may be used to identify a non-linguistic concept such as "brands" (e.g., cigarette brands Camel, Kent, and Marlboro), which may be augmented with additional (optional or required) non-linguistic concepts such as "type" (e.g., cigarette types "light", "extra-light", and "low-tar").

At 406, a region-matching regular expression 218 is defined using one or more class-matching networks 212 (which were produced at 402 and 404), for identifying one or more patterns of delimited strings. An example region-matching regular expression 218 is shown in FIG. 8 that combines four auxiliary lexicons into a single pattern for identifying noun phrases, identified by "Slogan". The four auxiliary lexicons include lexicons for specifying different determiners (i.e., "Det"), white space (i.e., "WS"), adjectives (i.e., "Adj"), and nouns (i.e., "Noun"). Each auxiliary lexicon lists the different possibilities for each within its class, three of which specify a different part-of-speech class: determiner, adjective, and noun. For the white space auxiliary lexicon, white space may be specified using one or more or a combination of blank spaces and dashes, whereas determiners may be specified using the articles "the" and "a". Example patterns that satisfy the regular expression "Slogan" defined in FIG. 8 include but are not limited to "the government", "the federal government", and "government agencies", where each auxiliary lexicon is identified in the regular expression Slogan with an Insert Flag Diacritic.

At 408 in FIG. 4, the region-matching regular expression 218 is compiled into a region-matching transducer 220 using, for example, the regular expression compiler 142. FIG. 8 illustrates a regular expression "Slogan" that may be compiled into the region-matching transducer shown in FIG. 9 using the regular expression compiler 142. As shown in FIG. 8, the region-matching transducer includes an arc that leads from a penultimate state with the transition label "</NP>" that identifies the entity class noun phrase (i.e., NP) and states that are shared between patterns that lead to the penultimate state (e.g., "the fox" and "the brown fox"). Advantageously, the region-matching transducer 220 is determinized and minimized, thereby sharing similar structure. For example, assuming the string "General Mills" is tagged as both a "Person" and a "Company", the path leading to each tag would be shared up until the closing XML tag (e.g., "</Person>" and "</Company>").

Referring again to FIG. 3, the region matching transducer 220 recorded in memory, at 304, is applied, at 306, to input data with an apply-stage replacement method. The input data, which may be corrupted, does not require pre-labeling before being applied to the region-matching transducer 220. The apply-stage replacement method follows a longest match principle for identifying one or more patterns in the region-matching transducer 220 that match one or more sequences of delimited strings in the input data. At least one of the matching sequences of delimited strings satisfies at least one pattern in the region-matching transducer defined by an arrangement of a plurality of class-matching networks.

Advantageously, the region matching transducer 220 may be applied to input data in a single pass while matching one or more patterns to the same input string. In one embodiment, when a string in the input data matches more than one pattern defined in the region matching transducer 220, then all matches are recorded together (e.g., <Person><Company>General Mills</Company></Person>). Alternatively, only one or a subset of all matching patterns may be recorded.

At 308, the one or more sequences of delimited strings satisfying at least one pattern in the region-matching transducer defined by an arrangement of a plurality of class-matching networks may be submitted to an application for further linguistic analysis, which includes but is not limited to translation, categorization, language identification, indexing, and intelligible information identification. Alternatively, the one more sequences of delimited strings may be output to an output device such as a memory, a printer, or a display.

FIG. 10 illustrates example input data, as well as resulting output when that input data is applied to the region-matching transducer shown in FIG. 9. For the output mode shown in the example in FIG. 10, the noun phrase patterns "The quick brown fox" and "the lazy dogs" that are identified in the example input data are marked in the example output with an initial XML tag with a noun phrase label (i.e., "<NP>") and an ending XML tag with a noun phrase label (i.e., "</NP>"). In an alternative output mode, each of the identified noun phrase patterns is output to a file that records all matches, which may include in the file for each match (a) a starting (e.g., byte) position, (b) the length of the match, (c) the matching tag (e.g., NP), and (d) the matching pattern. It will be appreciated that variations of these and other output modes, such as those set forth in Table 4 above, may be used to output matching patterns. For example, the output mode may be in a form adapted further processing, including further linguistic analysis (e.g., translation and categorization), or for output, including display and printing.

D Pattern Matching Network Applications

In this section, applications (in addition to the application for recognizing noun phrases shown in FIGS. 8-10) for the pattern matching networks developed in the preceding section are discussed.

D.1 Identifying Intelligible Information in Corrupted Input Data

Figures 11, 12:
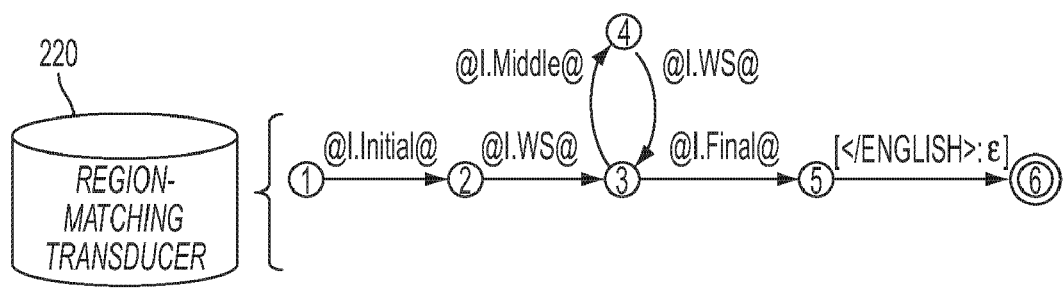
FIG. 11 illustrates an example regular expression.
FIGS. 12, 13, and 14 illustrate example region-matching transducers.

In one application, a region matching transducer 220 is developed for recognizing regions of uncorrupted (i.e., intelligible) language, such as English. FIG. 11 illustrates an example regular expression for developing a region matching transducer for identifying regions of uncorrupted language. In FIG. 11, four auxiliary lexicons are defined for (a) words that initially start a sentence (i.e., "Initial"), (b) elements that are used to signify a spacing between words such as white space or weak punctuation (i.e., "WS"), (c) words that span between the beginning and the end of a sentence (i.e., "Middle"), and (d) words that end a sentence together with strong or final punctuation (i.e., "Final"). These four auxiliary lexicons combined using the "English" regular expression are compiled into the region-matching transducer 220 illustrated in FIG. 12, where each auxiliary lexicon is identified in the English regular expression with an Insert Flag Diacritic. The resulting transducer extracts from input data regions of two or more English words that start with a capital letter and end in a sentence-final punctuation. Advantageously, the extracted sections may be submitted to an application which performs deeper analysis (e.g., morphological analsysis and part-of-speech disambiguation), thereby avoiding that application from having to spend time processing passages in the input data that would not likely yield results.

By way of example, the region-matching transducer 220 shown in FIG. 12 may be used in applications that require the review of a collection of heterogeneous documents (e.g., emails, publications, letters, etc.), with varying degrees of legibility (e.g., because of poor quality original documents and/or poor OCR accuracy), for relevant information. Advantageously, such a region matching transducer may be used for recognizing and indexing uncorrupted regions with intelligible value (i.e., regions in the heterogeneous documents that are of sufficient quality and substance for further application processing). Subsequently, these indexed regions of intelligible value may serve as the basis for further application processing, such as, classification, translation and indexing.

D.2 Identifying Text-Characterizations in Input Data

In another application, a region matching transducer 220 may be augmented to count identified patterns for performing text-characterization (e.g., categorization or classification) on input data, by for example, topic or language. For such applications, the region matching transducer 220 identifies a set of possible categories or classes for selected input data, such as natural language data, to which the region matching transducer is applied. Similar to pattern matching, text-characterization exploits the construct developed in FIG. 304(I) of a region-matching transducer 220 that specifies for each pattern an arc that leads from a penultimate state with a transition label that identifies the entity class or category of the pattern.

In pattern text-characterization applications, the transition label of the region-matching transducer 220, which is used to identify the characteristics (e.g., entity class or category) of an entity pattern, may be augmented to output both (i) an XML tag as a mark that indicates recognition of the pattern and (ii) a count indicating how many times the pattern has been matched. The resulting count associated with each XML tag may subsequently be recorded and used in various ways to categorize or classify the content to which the region-matching transducer is applied, for example topic or language.

Figure 13:
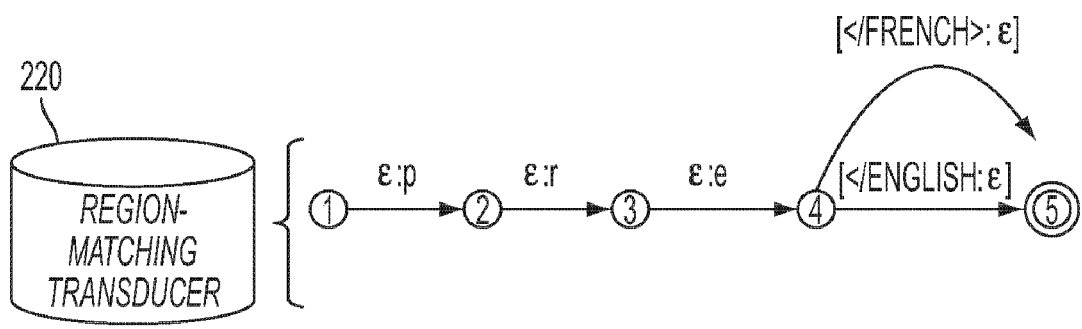

As illustrated in region-matching transducer shown FIG. 13, the path of the region-matching transducer 220 that an input string (or language data) has to match leads to a special transition labeled with a pair of symbols: an epsilon on the input (or lower) side and a special label ("</English>") on the output (or upper) side. In one embodiment of the FST engine 144, the matching of an input string against the path in the region-matching transducer 220 is indirect. That is, the arcs of the transducer are not actually labeled by strings or characters but by integers.

Figure 14:
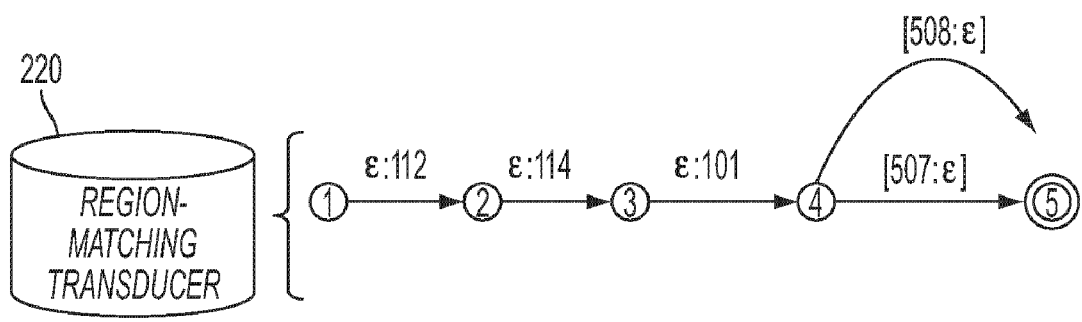
Figures 15, 16:
FIGS. 15 and 16 illustrate an example upper-parse table and an example lower-parse table, respectively.

An example of labeling indirection for the region-matching transducer shown in FIG. 13 is illustrated in FIGS. 14, 15, and 16. FIG. 14 illustrates symbol actual-values of each arc shown in FIG. 13 replaced with integer indirection-values. In one embodiment, the integer indirection-values for ASCII character symbols such as "p" is given by the integer representing the symbol of the corresponding ASCII value of the character, namely 112. In the case of multi-character labels such as "</English>" or multi-character symbols such as the number "217", the corresponding integer indirection-value is determined when the label is first encountered, which indirection-value may be represented by some integer n that may vary between instances of the FST engine 144 but are always unique within each instance.

As shown in the exemplary embodiment in FIGS. 14, 15, and 16, the association between integer indirection-values and symbol (or label) actual-values is maintained using hash tables, which allow the FST engine 144 to associate a symbol actual-value, such as "</English>", with its integer indirection-value, such as integer-value "507". In one embodiment of the data parse tables 226 shown in FIG. 2, an UPPER_PARSE_TABLE may be used to map symbol actual-values of the transducer's upper language to integer indirection-values, and a LOWER_PARSE_TABLE may be used to map symbol actual-values of the transducer's lower language to integer indirection-values, examples of which are shown in FIGS. 15 and 16, respectively. In addition as illustrated in FIG. 15, each PARSE_TABLE includes a hash table that maps any symbol actual-value to the integer indirection-value that represents it and a LABLE_TABLE that maps any known integer indirection-value to the label actual-value it represents.

For example, the upper-language symbol "</ENGLISH>" is represented by the integer indirection-value "507" as shown in the UPPER_PARSE_TABLE in FIG. 15. In operation, the UPPER_PARSE_TABLE is used to map the sequence of symbols "</E N G L I S H>" to the integer-value "507", and the LABEL_TABLE is used to map the integer indirection-value "507" to a structure that has several fields. In one embodiment, the structure of the LABEL_TABLE records any number of fields including the ID field, the NAME field and the DATA field. The ID field records the integer indirection-value representing an arc label such as "507". The NAME field records the unicode representation of a label actual-value, such as "</ENGLISH>".

In pattern matching applications with text-characterization, the DATA field of the LABEL_TABLE shown in FIG. 15 records additional information associated with its label (e.g., "507" corresponding to "/ENGLISH"), which for example may include an integer that records the number of occurrences the path associated with the label is traversed (e.g., trigram "pre") when a region-matching transducer is applied to input data. In one embodiment, the DATA field may be populated with the number of instances a pattern has been matched while performing the one or more of the output modes set forth in Table 4 of the apply-stage replacement method. When pattern counting is turned on and one of the output modes is selected, the closing pattern label, for example </NP>, may be used to keep a running count of how often the pattern is matched in selected language data. In an alternate output mode, only the count associated with each closing pattern is output.

In one application of text-characterization, a region-matching transducer 220 may be used by the FST engine 114 to identify the language (e.g., English, French, Spanish, etc.) of input language data 222 (e.g., a document). It is generally known in the art that a system for language identification does not require that it have knowledge of a language to identify it because the frequency of particular letters and letter combinations in input language data 222 has a particular distinguishable frequency for each language, which frequencies define each language's a characteristic signature.

In another application of text-characterization, a region-matching transducer 220 may be used by the FST engine 114 to classify or categorize input language data 222 by domain or topic area such as sports, technology, and fashion. In this embodiment, different domain or topic areas may be developed by collecting a set of words or expressions that describe each domain or topic area, and then determining n-gram frequency vectors representative of frequency profiles for the set of words or expression that describe each domain or topic area.

Generally, such text-characterization applications involve the computation of the n-gram-frequency for input data, such as a document, having an unknown language or class, for example, by counting the occurrence of n-grams defined in a region matching transducer that match input data to which the transducer is applied. Once computed, the n-gram-frequency for the document is compared with n-gram tables that each records the frequencies of n-grams for each possible language or class. The language or class of the document is identified as the language or class with an n-gram signature that most closely matches the n-gram signature of the document. The counts for n-grams (e.g., related to a language or a class) correspond to the frequency the corresponding n-grams occur in input data, where the n-grams may represent one or more n-gram classes (e.g., unigrams, bigrams, trigrams, etc.). For example, some n-gram language identification systems only rely on trigrams, some tri-grams of which are common in many languages (e.g., the trigram "pre" is one of the three hundred most common trigrams in the English language as well as a dozen other languages, while the trigram "suo" is one of the most frequent trigrams occurring in the Finnish language).

Figure 17:
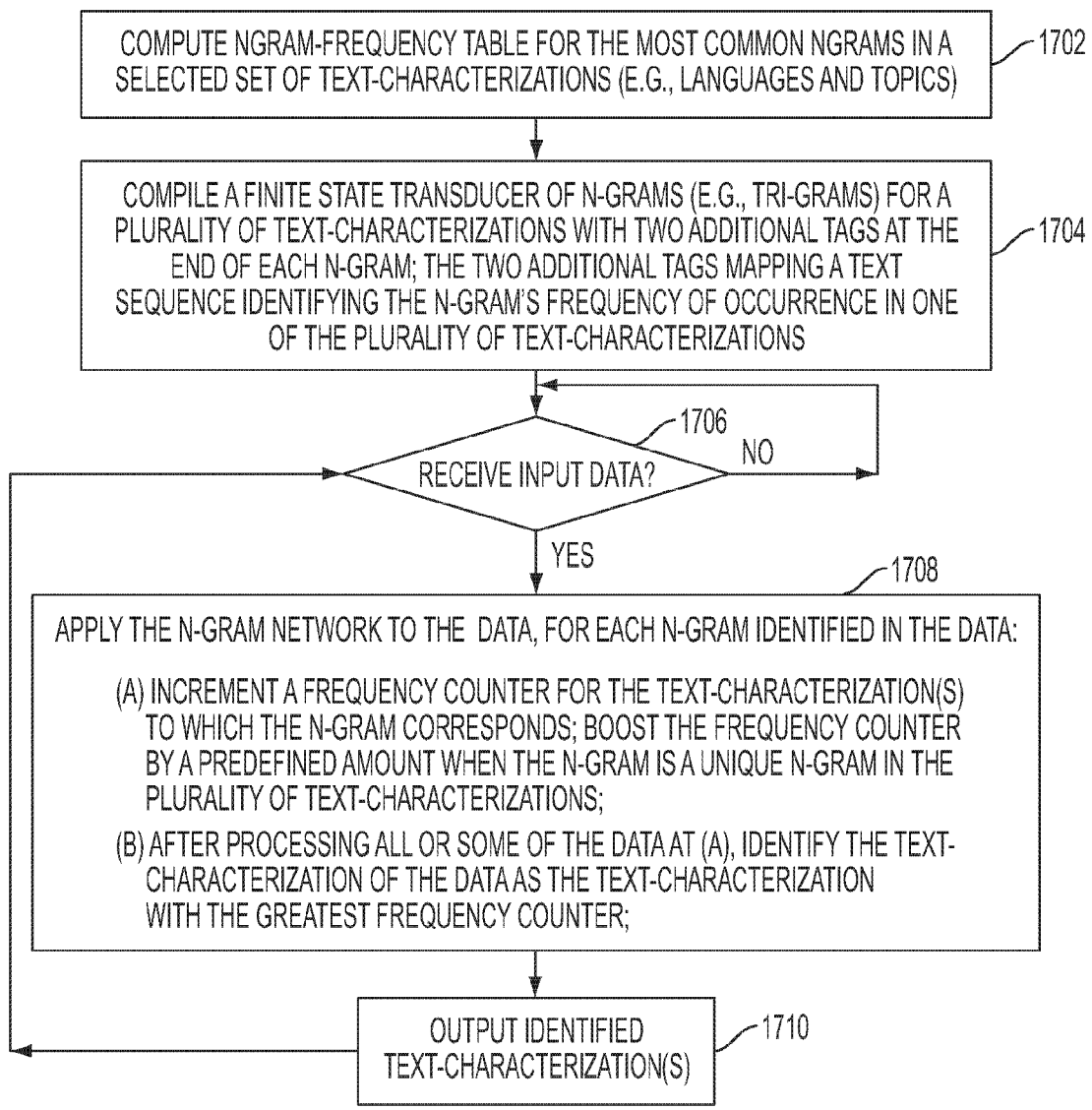
FIG. 17 illustrates an exemplary method for text-characterization.

One exemplary method for text-characterization is set forth in FIG. 17. At 1702, an n-gram-frequency table is computed for those most common n-grams for each text-characterization of a selected set of text-characterizations (e.g., languages, topics, etc.). In one exemplary embodiment for language identification, n-gram-frequency for the three hundred most frequent trigrams is computed for a selected set of languages.

Figure 18:
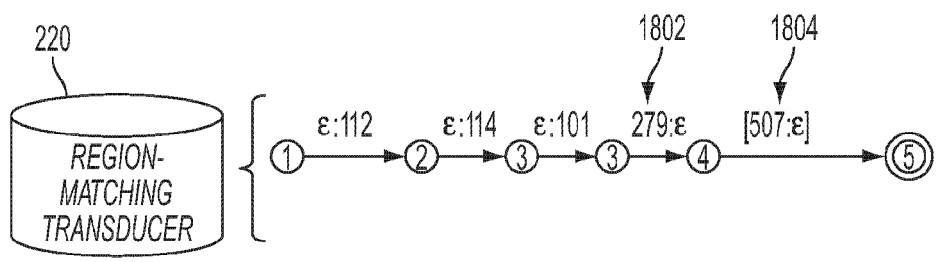
FIG. 18 illustrates an example region-matching transducer for use with language identification.

At 1704, a finite-state transducer of n-grams (e.g., trigrams, etc.) is compiled for a plurality of text-characterizations with two additional tags at the end of each n-gram. The two additional tags map a text sequence identifying the n-gram's frequency of occurrence in one of the plurality of text-characterizations. In the example application of language identification, when a network of trigrams in a set of text-characterizations is compiled for language identification, the trigrams for each language are compiled with two extra tags added to the end of each trigram path; the first extra tag identifying the trigram frequency and the second extra tag identifying the transition label that identifies language associated with the trigram. That is, all of the paths in the resulting region-matching transducer compiled at 1704 lead to a label with an epsilon on the input (or lower) side and a domain or language identifier such as "</English>" on the opposite side. For example, the region-matching transducer 220 for the English trigram shown in FIG. 18 has a path that maps the sequence [279 English] to the trigram [p r e], and vice versa, encoding the fact that 'pre' is the 279th most frequent trigram (identified by reference number 1802) in the English language (identified by reference number 1804). When the most common trigrams for all the languages are unioned into a single transducer at 1704, there are many paths for [p r e] each terminating with a different frequency and language tag.

When input data is received at 1706, n-gram counts for the plurality of text-characterizations are reset (e.g., set to zero). In the example shown in FIG. 15 for language identification, the DATA field of the terminating XML symbol "</ENGLISH>" is reset.

At 1708, the n-gram network compiled at 1706 is applied to input data, such as natural language data, received at 1706. For each n-gram matched in the input data, a frequency counter associated with the text-characterization to which the n-gram corresponds is incremented at 1706(A). After processing some or all of the input data at 1706(A), the text-characterization of the data is identified as (i.e., labeled with) the n-gram of the text-characterization in the finite state transducer of n-grams compiled at 1704 with the greatest frequency counter at 1706(B).

At 1708(A), when an n-gram is associated with a unique characterization (e.g., applies to only one language or a very small subset of languages) and a match occurs, the counter for the n-gram is boosted by a predetermined amount. For example, when a trigram is matched at 1708(A) while applying input data to the finite state transducer of n-grams compiled at 1704, the counts of all the language labels on the opposite side of the final epsilon transitions are incremented. In the example shown in FIG. 15, when a match occurs with a path in the transducer that terminates with a label that has an epsilon on the input side and an integer representing an XML symbol such as "</ENGLISH>" on the output side, the count in the DATA field of the corresponding label is incremented by one. If the last transition has no sister arcs, the count of the unique language to which it corresponds is boosted by a predefined amount (e.g., ten times the normal weight); otherwise the count is incremented by one. Such boosting of trigram counts may be used to distinguish between languages that are very similar to each other such as the case for Danish and Norwegian.

Once the finite state transducer of n-grams, compiled at 1704, is applied at 1708(A) to some or all input data received at 1706, a text-characterization (or alternatively a subset of text-characterizations) is identified from the plurality of text-characterizations (recorded in n-gram DATA fields of the finite state transducer at 1708(B)) as the text characterization with the greatest frequency counter (e.g., having the greatest frequency of occurrence in the input data). In the example for language identification, when determining the language for the input data "simple", all of the following trigrams are identified, starting from the beginning of the input data, where the symbol # represents a blank: [# s i], [s i m], [i m p], [m p l], [p l e], [l e #]. In operation, each trigram that is found in the transducer compiled at 1704 casts a vote (i.e., increment the frequency counter) for the language to which it belongs. A running count of the maximum number of votes is recorded in the frequency counter associated with each trigram. When all of the trigrams have been processed, the language or languages that have received the greatest number of recorded votes is the selected as the language to which the input data belongs. In the case of the input data "simple", the English language receives the most recorded votes.

At 1710, the text-characterization or set of text-characterizations identified at 1708(B) is output, which output may be used, for example, to tag and/or index the input data received at 1706. For example, natural language input data may be tagged by one or more recognized text-characterizations such as language and topic (e.g., for natural language input data "The president met with his cabinet in Washington today.", may be tagged using language and topic characterizations as "<ENGLISH><POLITICS>The president met with his cabinet in Washington today</POLITICS></ENGLISH>."

Advantageously, the method set forth in FIG. 17 performs one or more text-characterizations, such as language identification and topic identification, in a single pass through input data, such as language data, thereby avoiding multiple comparisons with pre-computed language vectors. That is, the n-gram frequency vector of the input data and the n-gram frequency vectors of all the candidate text-characterizations need not be individually computed; instead the method of FIG. 17 simultaneously computes n-gram frequency values in one pass over the input data. A further advantage with the method of FIG. 17 is that a text-characterization may be identified as soon as the input data or some representative portion of it (e.g., the first ten words) has been processed.

E. Corpus Indexing with Complex-Query Patterns

Figure 19:
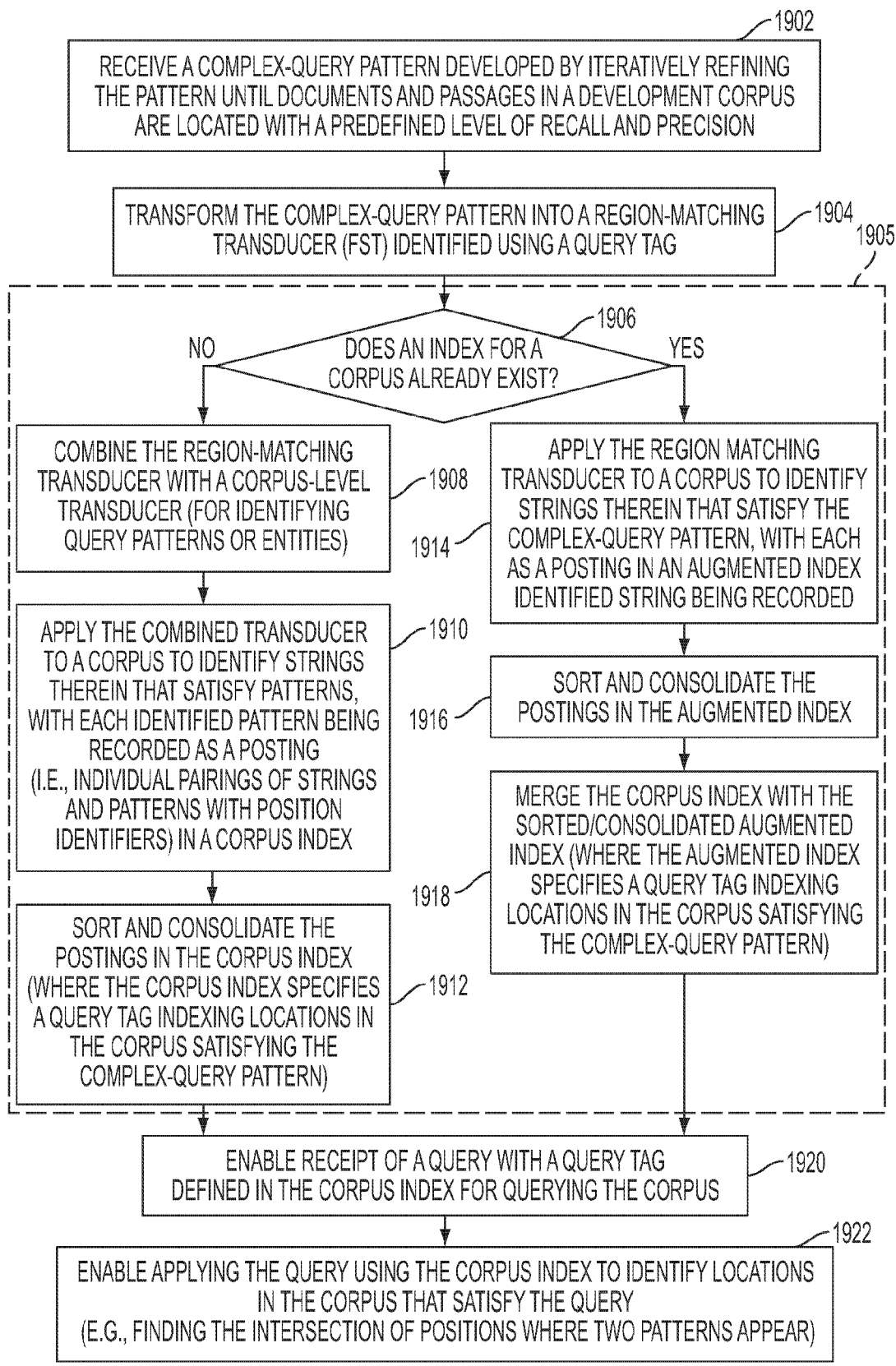
FIG. 19 sets forth a method for facilitating the search for content in a document collection by automating indexing of complex query-patterns within a document collection.

FIG. 19 sets forth a method for facilitating the search for content in a document collection by automating indexing of complex query-patterns within a document collection. A complex query pattern (i.e., that defines "a complex query"), which may be a simple or compound expression, may be used for identifying particular (well defined) patterns of string occurrences within a document using operators that perform set operations (e.g., AND and OR) and operators for constraining a search based on proximity (e.g., NEAR) and word order (e.g., NEXT). Query patterns may be defined using only specified terms. Alternatively, query patterns may be defined using additional (e.g., synonyms) or replacement terms.

Known indexing systems index words and allow the construction of complex queries. With such known indexing systems, the computational time required to process a complex query is generally dependent on its complexity. In some search applications, a complex query may be repeated using different limiting criteria. For example, some search applications (e.g., e-discovery) may query large document collections using a repeating complex query to find a topic of interest that is repeated with other limiting search criteria. For such applications, the method set forth in FIG. 19 advantageously permits complex queries to be performed on a document collection using a simplified operation by transforming such complex queries at run time into an indexing creation operation that may be accessed using a corpus index.

Figures 20, 21:
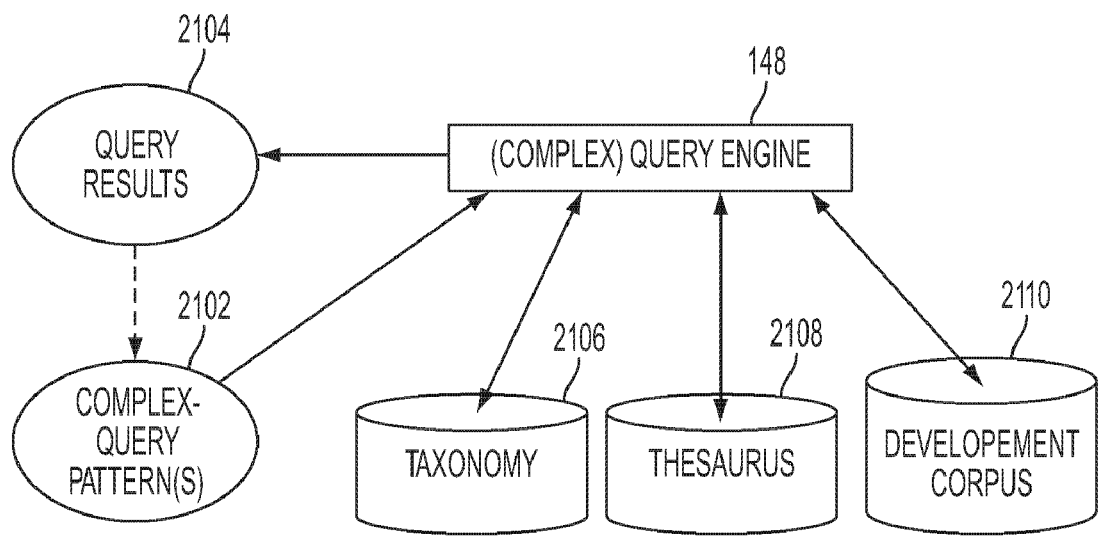
FIG. 20 illustrates an example complex query pattern.
FIG. 21 illustrates complex query development.

FIG. 20 is an example of a complex query pattern which defines a complex query that may be used to search for synonyms of the string "car" (including the terms car, automobile, vehicle, etc.) next to (or alternately that occurs within a defined number of words or a document structure such a paragraph or sentence) synonyms of "loan" (including the terms loan, financing, mortgage, etc.). The complex query may be labeled with the query tag "@car_loan". In the method set forth in FIG. 19, the complex query pattern may be compiled into a finite state transducer for indexing each occurrence of the pattern in a corpus. Every identified string in the corpus satisfying the complex-query pattern is recorded in a corpus index for efficient retrieval of such occurrences in the corpus when referred to in subsequent searches using its query tag.

At 1902 of the method set forth in FIG. 19, a complex-query pattern is received that is iteratively developed by refining the complex-query pattern until documents and passages in a development corpus are located with a predefined level of recall and precision. In one embodiment, the complex-query pattern that is received at 1902 is developed using the (complex) query engine 148 shown in FIG. 21. The query engine 148 is used to develop a complex query pattern 2102 directed at finding occurrences of specified terms in a defined arrangement of terms (e.g., having a defined order, structure, or proximity) within a document in development corpus 2110. The terms used to define the complex query patterns 2102 may be expanded, with additional or replacement terms using thesaurus 2108, and classified, with classification labels using taxonomy 2106.

After one or more complex-query patterns 2102 are defined, for example by a user or in an automated or semi-automated manner, the complex-query pattern 2102 is input to the query engine 148 to query a development corpus 2110, thereby producing query results 2104. The development corpus 2110 may be a set of documents that exemplify different classes of content, interest and genres that may form part of a larger corpus of documents. Depending on the quality of the query results 2104, the complex query pattern 2102 used to identify the query results 2104 is refined using the query engine 148. This process of refining the complex query 2102 may be repeated until query results 2102 are of sufficient quality to produce results with a predefined level of precision and recall. High quality query results may include the query results 2104 identifying documents from the development corpus 2110 that are related to specified content (e.g., documents related to an identified topic) and are adapted to identify documents of different genres (e.g., emails, memos, etc.).

Figures 22, 23:
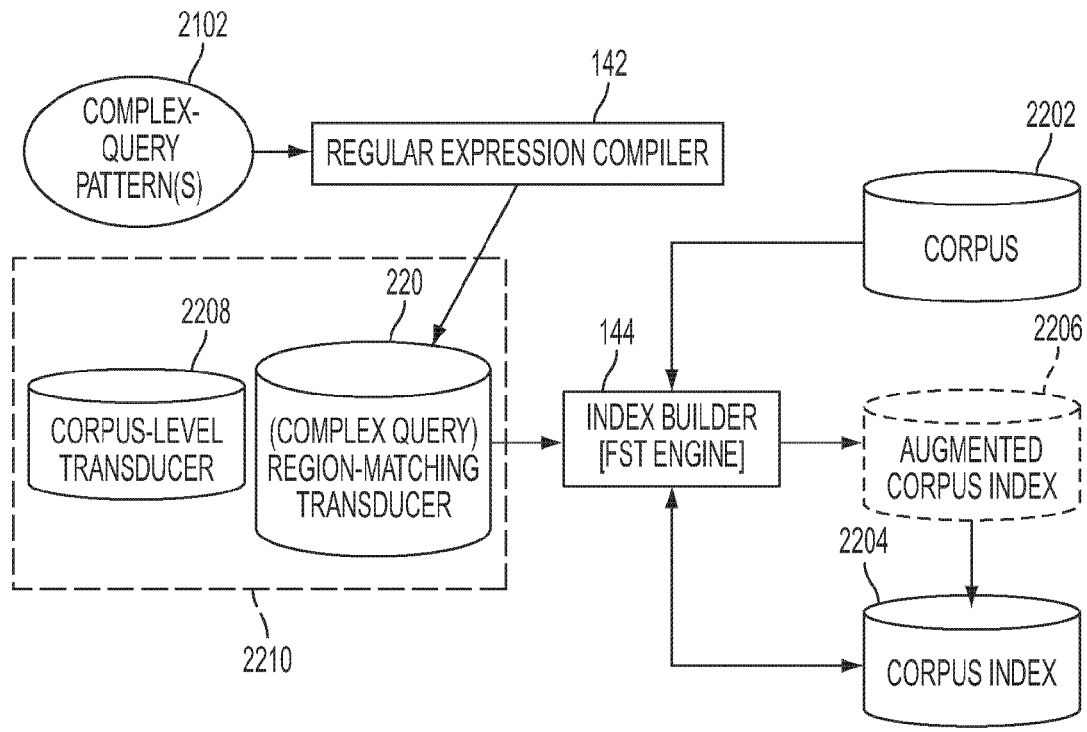
FIG. 22 illustrates indexing a corpus using a complex query.
FIG. 23 illustrates an example complex query in the form of a regular expression.

At 1904 in FIG. 19 and as shown in FIG. 22, the complex query pattern 2102 developed at 1902 is transformed into a region-matching transducer 220 using the regular expression compiler 142, as shown in FIG. 22, where the transition label of the arc that leads from the penultimate state of the region-matching transducer identifies the complex-query pattern. For example, a complex query "@car_loan" in the form of the regular expression shown in FIG. 23 may be compiled using regular expression compiler 142 into the region-matching transducer shown in FIG. 24 with the penultimate state transition label: "/car_loan". The terms of auxiliary lexicons CAR and LOAN identified in the regular expression @car_loan with an Insert Flag Diacritic shown in FIG. 23, may be expanded in a manual, semi-automated, or automated manner using the complex query engine 148 which accesses the taxonomy 2106 and the thesaurus 2108.

At 1905 in FIG. 19 and as shown in FIG. 22, the region matching transducer 220 is used by an index builder forming part of FST engine 144 to develop index 2204 or augmented index 2206 of corpus 2202. When the index 2204 for the corpus 2202 does not already exist at 1906, then the region-matching transducer is combined with a corpus-level transducer 2208 (e.g., using regular expression compiler 142) to define a combined transducer 2210 for identifying complex query patterns and/or entities from a part-of-speech class or an application-specific terminology class at 1908. Examples of corpus-level transducers are the class-matching networks which are described when referring to reference numbers 402 and 404 in FIG. 4.

At 1910, the combined transducer 2210 is applied to the corpus 2202 to identify strings therein that satisfy patterns defined in the combined transducer 2210, which produces a posting for each pattern identified in the corpus 2202. Each posting specifies a pairing identifying the pattern and the location of the string satisfying the pattern in the corpus 2202, which location may be specified on one or more levels (e.g., at the paragraph, sentence, or word level). At 1912, the postings produced at 1910 are sorted and consolidated to define the corpus index 2204 that includes tags indexing locations in the corpus satisfying the patterns (e.g., query tags that satisfy complex-query patterns).

Figures 24, 25:
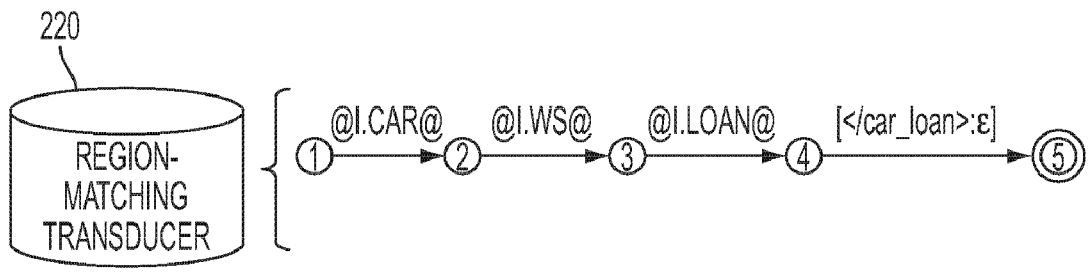
FIG. 24 illustrates the regular expression shown in FIG. 23 compiled as a region-matching transducer.
FIG. 25 illustrates example corpus data with positional information added identifying the start of each sentence.

For example, FIG. 25 illustrates example corpus data with positional information added identifying the start of each sentence, where the first sentence starts at the $1^{st}$ character position and the second sentence starts at the $58^{th}$ character position of the corpus data. FIG. 26 illustrates a set of postings (produced at 1910 in FIG. 19) identified by the region-matching transducer illustrated in FIG. 24 when applied to the example corpus data illustrated in FIG. 25, where the postings shown in FIG. 26 are at the sentence level (e.g., the identified patterns "John", "buy", "automobile", "dealer", and "bank loan" all appear in the first sentence). The postings include patterns identified by the corpus level transducer 2208 (e.g., nouns such as "automobile" and "dealer") as well as the patterns identified by the region-matching transducer 220 (e.g., the complex query pattern identified with the query tag "/car_loan"). FIG. 27 illustrates the set of posting shown in FIG. 26 after having been sorted and consolidated (e.g., the identified patterns "automobile", "bank loan", "buy", "dealer", and "John" appear together and in alphabetical order).

Figures 28, 29, 30:
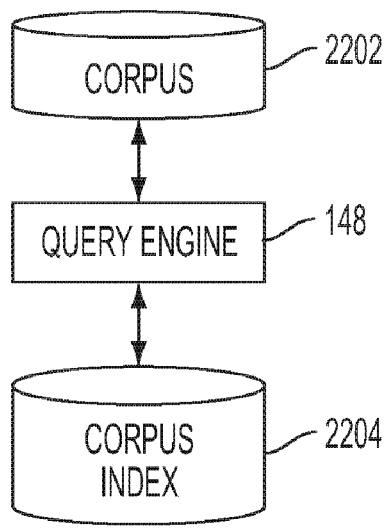
FIG. 28 illustrates a query engine for receiving queries with query tags.
FIG. 29 illustrates an example query using an query tag.
FIG. 30 illustrates example search results after performing the search using the query shown in FIG. 29 on the corpus shown in FIG. 25 using the corpus index shown in FIG. 27.

At 1920 in FIG. 19 and as shown in FIG. 28, query engine 148 is enabled for receiving a query for searching corpus 2202 using a query tag that may be used to identify in the corpus index 2204 positions in the corpus 2202 satisfying its corresponding complex-query pattern. At 1922, the query engine is further enabled for applying the query received at 1920 using the corpus index 2204 to identify locations in the corpus 2202 that satisfy the query. Depending on the parameters (e.g., operators) used to define the relationship between one or more query tags (identifying indexed complex-query patterns) and terms of the query received at 1920, the application of the query at 1922 may include identifying, using the corpus index 2204, positions where the one or more indexed complex-query patterns and terms appear in the corpus 2202 with some predefined arrangement or order. For example, FIG. 29 illustrates a query using the query tag "@car_loan" (which corresponds to the complex-query pattern defined by the region matching transducer 220 shown in FIG. 24), the operator "AND", and the term "John". FIG. 30 illustrates example search results after performing the search using the query shown in FIG. 29 on the corpus shown in FIG. 25 using the corpus index shown in FIG. 27. As shown in FIG. 30, the search involves intersecting sentence positions where both query terms appear in view of the AND operator, which occurs in the example corpus shown in FIG. 25 in the first sentence. More specifically, the complex-query pattern label "/car_loan" and the term "John" both appear together in the first sentence, where the example corpus has been indexed at the sentence level.

FIG. 20 is an exemplary method for expanding a complex query using synonyms. In this exemplary method, the operator "SYNS" is included in the query language to expand a specified term to include synonyms of that term. For example, a search limited to "car" may retrieve only that exact word and, possibly, the morphological variants of "car" such as "cars". The expression "SYNS(car)" may retrieve additional terms such as "automobile" and "vehicle" and, possibly, their morphological variants. Operators such as "SYNS" may be used for defining searches that explore more general concepts rather than specific arrangements of entities.

In an alternative method for expanding a complex query, the expansion is made to occur in the corpus index 2204, rather than expanding original query terms with additional terms. In this alternative method, the corpus index 2204 records which term occurrences are from original words and which are from synonyms. For example, the query expression SYNS(car) in this alternative method would return all occurrences of any synonym for the term using the corpus index 2204.

Returning again to FIG. 19, when the index 2204 for the corpus 2202 already exist at 1906 then the region matching transducer is applied to the corpus 2202 to identify strings therein that satisfy the complex-query pattern received at 1902, where each identified string is recorded as a posting in an augmented index, where the augmented index specifies a query tag indexing locations in the corpus that satisfy the complex-query pattern. At 1916, the augmented index is consolidated and sorted, and 1918, the corpus index developed at 1908, 1910, and 1912 is merged with the augmented index.

Accordingly, the method shown in FIG. 19, for facilitating the search for content in a document collection by automating the indexing of complex query-patterns within the document collection, may be used for enabling searches using complex-query patterns with named components (e.g., query tag "@car_loan"). Advantageously, the method translates the complex-query patterns into a region-matching transducer 220 that is used to recognize patterns defined therein that are subsequently encoded into a corpus index. In one embodiment, the method is adapted to track when query patterns are first compiled so that subsequent query patterns that are developed which are similar are not expanded and re-encoded into the corpus index.

F. Miscellaneous

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims. Those skilled in the art will recognize that memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other wired or wireless network systems/communication links.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer implemented method, comprising:
   receiving in a memory a complex-query pattern, wherein the complex-query pattern identifies a relationship between a plurality of words using a query language;
   receiving a corpus;
   transforming with a processor the complex-query pattern into a region matching transducer, wherein the transducer is a form of a finite state network;
   determining whether a corpus index exists;
   in response to determining the corpus index does not exist:
      combining a corpus-level transducer and the region matching transducer; and
      applying the combined transducer to the corpus to identify strings therein that satisfy patterns defined in the corpus-level transducer, including the complex-query pattern, with each identified pattern being recorded in the corpus index;
   in response to determining the corpus index exists:
      applying the region matching transducer to the corpus to identify strings therein that satisfy the complex-query pattern, with each identified pattern being recorded in an augmented index; and
      merging the corpus index with the augmented index specifying locations in the corpus satisfying the complex-query pattern;
   storing in the memory the corpus index that records a query tag for indexing locations in the corpus satisfying the complex-query pattern.

2. The method according to claim 1, further comprising developing the complex-query pattern using a reduced corpus that contains a portion of the corpus.

3. The method according to claim 2, wherein said developing the complex-query pattern is performed by iteratively refining the complex-query pattern until search results are produced with a predefined level of recall and precision.

4. The method according to claim 1, wherein said applying the region matching transducer identifies at least one of one or more sequences of delimited strings in the corpus that satisfies at least one pattern defined in the region matching transducer.

5. The method according to claim 4, further including:
   developing the corpus index by applying the corpus-level transducer to the corpus for indexing one or more strings identified in the corpus; the corpus-level transducer following a longest match principle when identifying the one or more strings in the corpus data; and at least one of the patterns in the corpus-level transducer having an arc that leads from a penultimate state with a transition label that identifies a query tag.

6. The method according to claim 5, wherein the corpus-level transducer shares states between patterns leading to a penultimate state when segments of delimited strings making up two or more patterns overlap.

7. The method according to claim 1, further comprising: receiving a query with the query tag for querying the corpus; and applying the query using the corpus index to identify locations in the corpus that satisfy the query.

8. A computer apparatus, comprising:
   a memory for storing processing instructions of the apparatus; and
   a processor coupled to the memory for executing the processing instructions of the apparatus; the processor in executing the processing instructions:
      receiving in the memory a complex-query pattern, wherein the complex-query pattern identifies a relationship between a plurality of words using a query language;
      receiving a corpus;
      transforming the complex-query pattern into a region matching transducer, wherein the transducer is a form of a finite state network;
      determining whether a corpus index exists;
      in response to determining the corpus index does not exist:
         combining a corpus-level transducer and the region matching transducer; and
         applying the combined transducer to the corpus to identify strings therein that satisfy patterns defined in the corpus-level transducer, including the complex-query pattern, with each identified pattern being recorded in the corpus index;
      in response to determining the corpus index exists:
         applying the region matching transducer to the corpus to identify strings therein that satisfy the complex-query pattern, with each identified pattern being recorded in an augmented index; and
         merging the corpus index with the augmented index specifying locations in the corpus satisfying the complex-query pattern;
      storing in the memory the corpus index that records a query tag for indexing locations in the corpus satisfying the complex-query pattern.

9. The apparatus according to claim 8, wherein the processor in executing the processing instructions develops the complex-query pattern using a reduced corpus that contains a portion of the corpus.

10. The apparatus according to claim 8, wherein said applying the region matching transducer identifies at least one of one or more sequences of delimited strings in the corpus that satisfies at least one pattern defined in the region matching transducer.

11. The apparatus according to claim 8, wherein the processor in executing the processing instructions: receives a query with the query tag for querying the corpus; and applies the query using the corpus index to identify locations in the corpus that satisfy the query.

12. A computer apparatus, comprising:
a means for storing in a memory a complex-query pattern, wherein the complex-query pattern identifies a relationship between a plurality of words using a query language;
means for receiving a corpus;
means for transforming the complex-query pattern into a region matching transducer, wherein the transducer is a form of a finite state network;
means for determining whether a corpus index exists;
in response to determining the corpus index does not exist:
a means for combining a corpus-level transducer and the region matching transducer; and
a means for applying the combined transducer to a corpus to identify strings therein that satisfy patterns defined in the corpus-level transducer, including the complex-query pattern, with each identified pattern being recorded in a corpus index;
in response to determining the corpus index exists:
a means for applying the region matching transducer to the corpus to identify strings therein that satisfy the complex-query pattern, with each identified pattern being recorded in an augmented index; and
a means for merging the corpus index with the augmented index specifying locations in the corpus satisfying the complex-query pattern;
a means for storing in the memory the corpus index that records a query taq for indexing locations in the corpus satisfying the complex query pattern.

13. The apparatus according to claim 12, further comprising means for developing the complex-query pattern using a reduced corpus that contains a portion of the corpus.

14. The apparatus according to claim 12, wherein said means for applying the region matching transducer identifies at least one of one or more sequences of delimited strings in the corpus that satisfies at least one pattern defined in the region matching transducer.

15. The apparatus according to claim 12, further comprising: means for receiving a query with the query tag for querying the corpus; and means for applying the query using the corpus index to identify locations in the corpus that satisfy the query.

16. An article of manufacture comprising a non-transitory media including computer readable instructions embedded therein that causes a computer to perform a method, wherein the method comprises:
receiving in a memory a complex-query pattern, wherein the complex-query pattern identifies a relationship between a plurality of words using a query language;
transforming the complex-query pattern into a region matching transducer, wherein the transducer is a form of a finite state network;
combining a corpus-level transducer and the region matching transducer;
applying the combined transducer to a corpus to identify strings therein that satisfy patterns defined in the corpus-level transducer, including the complex-query pattern, with each identified pattern being recorded in a corpus index;
applying the region matching transducer to the corpus to identify strings therein that satisfy the complex-query pattern, with each identified pattern being recorded in an augmented index;
merging the corpus index with the augmented index specifying locations in the corpus satisfying the complex-query pattern; and
storing in the memory the corpus index that records a query tag for indexing locations in the corpus satisfying the complex-query pattern.

17. The article of manufacture according to claim 16, wherein the method further comprises developing the complex-query pattern using a reduced corpus that contains a portion of the corpus.

18. The article of manufacture according to claim 16, wherein said applying the region matching transducer identifies at least one of one or more sequences of delimited strings in the corpus that satisfies at least one pattern defined in the region matching transducer.

19. The article of manufacture according to claim 16, wherein the method further comprises:
receiving a query with the query tag for querying the corpus; and
applying the query using the corpus index to identify locations in the corpus that satisfy the query.

* * * * *